US011349293B2

(12) United States Patent
Ostrovsky

(10) Patent No.: US 11,349,293 B2
(45) Date of Patent: May 31, 2022

(54) PROCESSOR-BASED CIRCUIT INTERRUPTING DEVICES

(71) Applicant: LEVITON MANUFACTURING CO., INC., Melville, NY (US)

(72) Inventor: Michael Ostrovsky, Brooklyn, NY (US)

(73) Assignee: Leviton Manufacturing Co., Inc., Melville, NY (US)

(*) Notice: Subject to any disclaimer, the term of this patent is extended or adjusted under 35 U.S.C. 154(b) by 357 days.

(21) Appl. No.: 16/538,384

(22) Filed: Aug. 12, 2019

(65) Prior Publication Data
US 2019/0363531 A1 Nov. 28, 2019

Related U.S. Application Data

(63) Continuation of application No. 14/858,533, filed on Sep. 18, 2015, now Pat. No. 10,396,451, which is a continuation of application No. 13/632,524, filed on Oct. 1, 2012, now Pat. No. 9,276,393.

(51) Int. Cl.
H02H 1/00 (2006.01)
H02H 3/04 (2006.01)
H02H 3/33 (2006.01)
H02H 3/20 (2006.01)

(52) U.S. Cl.
CPC .......... H02H 1/0015 (2013.01); H02H 3/044 (2013.01); H02H 3/20 (2013.01); H02H 3/335 (2013.01); H02H 3/338 (2013.01)

(58) Field of Classification Search
CPC ........ H02H 1/0015; H02H 3/20; H02H 3/044; H02H 3/335; H02H 3/338

USPC ........................................................ 361/45
See application file for complete search history.

(56) References Cited

U.S. PATENT DOCUMENTS 4,595,894 A 6/1986 Doyle et al.
5,136,458 A 8/1992 Durivage, III
5,309,310 A 5/1994 Baer et al.
5,446,383 A 8/1995 Pearse et al.
(Continued)

FOREIGN PATENT DOCUMENTS

WO 2009097469 A1 8/2009

OTHER PUBLICATIONS

PCT International Search Report and Written Opinion dated Mar. 7, 2014 for PCT/US13/61428.

Primary Examiner — Kevin J Comber
(74) Attorney, Agent, or Firm — Carter, DeLuca & Farrell LLP; George Likourezos

(57) ABSTRACT

Circuit interrupting devices are provided. One circuit interrupting device includes a fault sensor configured to output a sensor signal; a voltage sensor configured to sense a reference voltage; and a controller configured to determine an occurrence of an actual fault based on the sensor signal and the reference voltage. The circuit interrupting device further includes an amplifier configured to receive the sensor signal and the reference voltage and output an amplified signal; an analog-to-digital converter configured to receive the reference voltage and the amplified signal and output respective digital signals corresponding to the reference voltage and the amplified signal; and a line interrupt assembly configured to interrupt current flow through a conductive path when a characteristic of the sensor signal exceeds an actual fault threshold.

23 Claims, 7 Drawing Sheets

(56) References Cited

U.S. PATENT DOCUMENTS

| | | |
|---|---|---|
| 5,652,511 A | 7/1997 | Pearse et al. |
| 5,710,408 A | 1/1998 | Jones |
| 5,747,980 A | 5/1998 | Gershen |
| 6,040,967 A | 3/2000 | DiSalvo |
| 6,097,580 A | 8/2000 | Zaretsky |
| 6,107,611 A | 8/2000 | Jones |
| 6,191,589 B1 | 2/2001 | Clunn |
| 6,218,647 B1 | 4/2001 | Jones |
| 6,246,556 B1 | 6/2001 | Haun et al. |
| 6,266,219 B1 | 7/2001 | Macbeth et al. |
| 6,301,128 B1 | 10/2001 | Jang et al. |
| 6,377,427 B1 | 4/2002 | Haun et al. |
| 6,459,273 B1 | 10/2002 | Dollar, II et al. |
| 6,532,424 B1 | 3/2003 | Haun et al. |
| 6,621,669 B1 | 9/2003 | Haun et al. |
| 6,807,035 B1 | 10/2004 | Baldwin et al. |
| 7,441,173 B2 | 10/2008 | Restrepo et al. |
| 8,085,516 B1 | 12/2011 | Armstrong |
| 8,130,480 B2 | 3/2012 | DiSalvo |
| 8,164,322 B2 | 4/2012 | Shimura |
| 8,599,523 B1 | 12/2013 | Ostrovsky et al. |
| 9,276,393 B2 | 3/2016 | Ostrovsky |
| 2003/0156367 A1* | 8/2003 | Macbeth .............. H02H 1/0015 361/38 |
| 2004/0223272 A1 | 11/2004 | Germain et al. |
| 2005/0083616 A1 | 4/2005 | Reid et al. |
| 2007/0279814 A1 | 12/2007 | Bonilla et al. |
| 2008/0106833 A1 | 5/2008 | Lewinski et al. |
| 2010/0295568 A1 | 11/2010 | Ostrovsky et al. |
| 2011/0216453 A1 | 9/2011 | Haines et al. |
| 2014/0092503 A1 | 4/2014 | Ostrovsky |
| 2015/0109077 A1 | 4/2015 | Tomimbang et al. |

\* cited by examiner

PROCESSOR-BASED CIRCUIT INTERRUPTING DEVICES

BACKGROUND

Technical Field

The present disclosure relates generally to processor-based circuit interrupting devices. In particular, the present disclosure relates to microcontroller-based circuit interrupting devices having noise protection and/or self-test functions.

Description of Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. Presently available ground fault circuit interrupting (GFCI) devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. Further, an open neutral condition, which is defined in Underwriters Laboratories (UL) Standard PAG 943A, may exist with the electrical wires supplying electrical power to such GFCI devices. Commonly owned application Ser. No. 09/138,955 filed Aug. 24, 1998 (now U.S. Pat. No. 6,040,967), which is incorporated herein in its entirety by reference, describes a family of resettable circuit interrupting devices capable of locking out the reset portion of the device if the circuit interrupting portion is non-operational or if an open neutral condition exists.

Some of the circuit interrupting devices described above have a user accessible load side connection in addition to the line and load side connections. The user accessible load side connection includes one or more connection points where a user can externally connect to electrical power supplied from the line side. The load side connection and user accessible load side connection are typically electrically connected together. An example of such a circuit interrupting device is a GFCI receptacle, where the line and load side connections are binding screws and the user accessible load side connection is the plug connection to an internal receptacle. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains.

Commonly owned application Ser. No. 13/192,860 filed Jul. 28, 2011 (now U.S. Pat. No. 8,130,480), which is incorporated herein in its entirety by reference, describes a family of resettable circuit interrupting devices capable of locking out the reset portion of the device if the circuit interrupting portion is non-operational or if an open neutral condition exists, and also capable of providing reverse wiring protection.

Other circuit interrupting devices include arc fault circuit interrupting devices (AFCI's), immersion detection circuit interrupting devices (IDCI's), appliance leakage circuit interrupting devices (ALCI's), equipment leakage circuit interrupting devices (ELCI's), circuit breakers, contactors, latching relays and solenoid mechanisms.

SUMMARY

The present disclosure is directed to processor-based circuit interrupting devices. In one aspect of the present disclosure, a fault circuit interrupting device includes a fault sensor configured to output a sensor signal; a voltage sensor configured to sense a reference voltage; and a controller configured to determine an occurrence of an actual fault based on the sensor signal and the reference voltage. The fault circuit interrupting device further includes an amplifier configured to receive the sensor signal and the reference voltage and output an amplified signal. The fault circuit interrupting device further includes an analog-to-digital converter configured to receive the reference voltage and the amplified signal and output respective digital signals corresponding to the reference voltage and the amplified signal. The fault circuit interrupting device further includes a line interrupt assembly. The line interrupt assembly interrupts current flow through a conductive path when the characteristic of the sensor signal exceeds an actual fault threshold. The fault sensor can be a differential transformer.

The processor is selected from the group consisting of a microcontroller, a system on chip (SOC), and a field programmable gate array. The processor is further configured to determine whether the reference voltage exceeds a voltage threshold in determining the occurrence of the actual fault.

The amplifier amplifies a characteristic of the sensor signal in accordance with a gain. The amplified signal has a frequency identical to a frequency of the sensor signal.

The fault circuit interrupting device further includes a gain circuit, wherein, based on the frequency of the sensor signal, the gain circuit adjusts the gain accordingly. The gain is adjusted to a first adjusted gain when the sensor signal has a first frequency, and the gain is adjusted to a second adjusted gain when the sensor signal has a second frequency.

The fault circuit interrupting device further includes a self-test circuit configured to automatically initiate a self-test. The self-test includes circuitry configured to generate a simulated fault for testing operation of the fault circuit interrupting device.

The fault circuit interrupting device further includes a manual test assembly comprising a test button configured to initiate a test. The test is configured to interrupt a conductive path and generate a simulated fault.

The fault circuit interrupting device further includes an arc fault sensor configured to output an arc sensor signal, indicative of an arc fault condition, to the controller. The controller is configured to trigger a line interrupt assembly when the arc sensor signal exceeds an arc fault threshold.

The fault circuit interrupting device further includes a resistor connected across a first and a second conductor via which the sensor signal is output from the fault sensor for avoiding saturation of the fault sensor. The fault sensor includes a differential transformer.

The fault circuit interrupting device further includes a grounded neutral transformer configured to output a signal if a neutral conductor is grounded.

The fault circuit interrupting device further includes a test circuit configured to generate a simulated electrical fault condition. The controller is further configured to initiate a test operation including triggering the test circuit to generate the simulated fault condition, determine whether a characteristic of the amplified signal exceeds a test fault threshold during performance of the test operation without triggering a line interrupt assembly unless a characteristic of the amplified signal exceeds an actual fault threshold, and indicate the occurrence of a test failure when the test operation terminates and the determination is false. The line interrupt assembly interrupts current flow through a conductive path when the characteristic of the amplified signal exceeds the actual fault threshold.

The fault circuit interrupting device further includes a memory unit. The controller is configured to execute an algorithm for calculating a gain of the amplifier. The algorithm including at least one constant that influences the determination of the gain, the at least one constant being stored in the memory unit, and the controller is further configured to adjust the at least one constant for adjusting the calculation of the gain during a calibration procedure.

The controller is further configured to determine an expected value for a characteristic of the amplified signal during a test operation in which the value of a characteristic of the at least one signal is known, determine the value for the characteristic of the amplified signal as measured during the test operation, determine a difference between the expected value for the characteristic of the amplified signal and the determined value for the characteristic of the amplified signal, store the difference as an offset compensation constant in the memory unit, and apply the offset compensation constant in subsequent determinations of the value of the characteristic of the amplified signal.

The controller includes a compensation module for determining when the amplifier is saturated and, based on determining the amplifier is saturated, adjusts a value of a characteristic of the amplified signal by a predetermined factor.

The controller is further configured to iteratively sample a characteristic of the amplified signal, and calculate an integrated value for the characteristic of the amplified signal iteratively, including executing an integration algorithm using the sampled values for the characteristic of the amplified signal.

The fault circuit interrupting device further includes a voltage regulator having a linear regulator component. The controller is further configured to control the linear regulator component. The linear regulator component includes a variable resistor and the controller controls the resistance of the variable resistor.

The controller is further configured to monitor a voltage input to a voltage regulator for detecting when a bridge diode fails to conduct current.

The controller is further configured to perform at least one diagnostic test to check at least one component of the fault circuit interrupting device.

The fault circuit interrupting device further includes at least one sensor configured to sense an environmental parameter and provide an output signal indicative of the environmental parameter. The controller is further configured to adjust at least one software component of the fault circuit interrupting device in accordance with the output signal indicative of the environmental parameter. The environmental parameter is humidity and/or temperature. The sensor is located internally within the fault circuit interrupting device, located externally of the fault circuit interrupting device, and/or integrated with the controller.

The controller is further configured to interrupt current flow to a conductor if the occurrence of an actual fault is determined. The controller is further configured to determine an RMS value of the sensor signal.

The controller is selected from the group consisting of a microcontroller, system on chip (SOC), and field programmable gate array (FPGA). The circuit interrupting device is selected from the group consisting of a GFCI device, an AFCI device, and a GFCI/AFCI device.

According to another aspect of the present disclosure, there is provided a fault circuit interrupting device which includes a fault circuit interrupting circuit for interrupting current flow through a conductive path after detection of a fault condition; a voltage regulator in operative communication with the fault interrupting circuit and configured to receive a voltage; and a controller configured to monitor the voltage for detecting failure of a diode of a bridge rectifier. The fault circuit interrupting device is selected from the group consisting of a GFCI device, an AFCI device, and a GFCI/AFCI device.

According to another aspect of the present disclosure, there is provided a fault circuit interrupting device which includes a first sensor configured to output a first signal having a first frequency and a first characteristic; a second sensor positioned in proximity to the first device; a gain circuit including a frequency dependent component configured to adjust a gain based on the frequency of the first signal such that when the first signal has a first frequency, the gain is adjusted to a first adjusted gain, and when the first signal has a second frequency, the gain is adjusted to a second adjusted gain that is different than the first adjusted gain; an amplifier configured to receive the first signal and amplify the first characteristic in accordance with either the first or second adjusted gain, and outputting a corresponding amplified signal having a second characteristic and the same frequency as the first signal; a line interrupt assembly configured to interrupt flow of current through a conductor when triggered; and a controller configured to trigger the line interrupt assembly when the second characteristic exceeds an actual fault threshold.

The fault circuit interrupting device further includes an arc fault circuit interrupter (AFCI) circuit that outputs an arc signal indicative of an arc fault condition to the controller, wherein the controller is configured to trigger the line interrupt assembly when the arc signal provided by the AFCI circuit exceeds an arc fault threshold. The first sensor is a differential transformer, the electrical fault is a ground fault, and the second sensor is a grounded neutral transformer.

The fault circuit interrupting device further includes a reference voltage circuit configured to receive a voltage signal from a power source and output a corresponding reference signal having a reference voltage. The amplifier is configured to further receive the reference signal; and the controller is further configured to receive a digitized value corresponding to the reference voltage and trigger the line interrupt assembly when the second characteristic of the amplified signal exceeds the actual fault threshold and the received voltage value for the reference voltage does not exceed a noise threshold.

The fault circuit interrupting device further includes a self-test assembly configured to automatically initiate a self-test. The self-test includes generating a simulated fault for testing operation of said system. The fault circuit interrupting device further includes a manual test assembly having a test button configured to initiate a test. The test includes opening at least one contact in electrical communication with the conductor and generating a simulated fault.

According to another aspect of the present disclosure, there is provided a method for monitoring a circuit for an electrical fault condition. The method includes receiving a voltage signal and generating a reference voltage signal; digitizing the reference voltage signal using an analog-to-digital converter and generating a digital signal corresponding to the reference voltage signal; and processing the digital signal corresponding to the reference voltage signal and a sensor signal outputted from a transformer for determining the occurrence of an electrical fault condition. The method further includes interrupting delivery of current to a load if occurrence of the electrical fault condition is determined.

According to another aspect of the present disclosure, there is provided a circuit interrupting device which includes a sensing device in operative communication with a solenoid. The sensing device is configured for sensing an electrical fault condition and generating a signal in response to the sensed electrical fault condition for moving the solenoid. The electrical fault condition is associated with current flowing through a conductor electrically coupled to a power source which generates a current output. The sensing device further includes an amplifier configured for receiving the signal and generating an amplified signal; a test circuit configured to generate a simulated fault condition along the conductor; a line interrupt assembly configured to interrupt current flow through the conductor; and a controller configured to control the test circuit for initiating a test operation which includes triggering the test circuit to generate the simulated fault condition.

The test operation terminates after a predetermined time interval. The predetermined time interval is less than a time required to trigger the line interrupt assembly after occurrence of an actual fault. The simulated fault condition includes a test signal. An amplitude of the test signal is less than an amplitude of the signal during an actual fault.

The conductor can be a first conductor, and the system includes a second conductor. The simulated fault condition includes generating an imbalance in currents passing through the first and second conductors. The imbalance includes adding a supplemental current to at least one of the first and second conductors. The supplemental current is not synchronized with the current output by the power source. The supplemental current is generated through a substantial portion of two half cycles associated with the current output by the power source. The two half cycles are successive half cycles.

Other features of the presently disclosed circuit interrupting devices will become apparent from the following detailed description, taken in conjunction with the accompanying drawings, which illustrate, by way of example, the presently disclosed circuit interrupting devices.

BRIEF DESCRIPTION OF THE DRAWINGS

Various embodiments of the present disclosure will be described below with reference to the figures, wherein.

DETAILED DESCRIPTION

Figure 1:
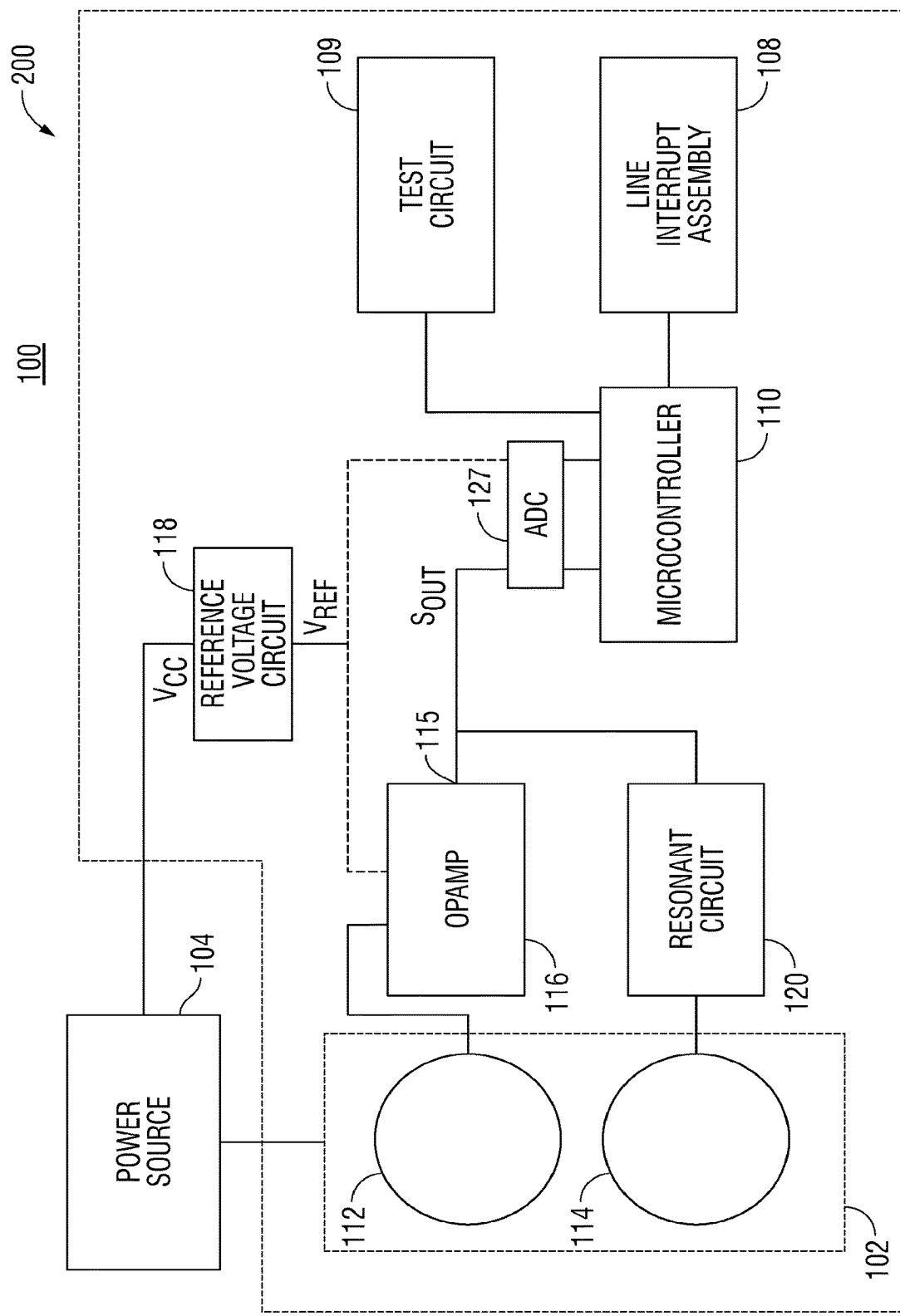
FIG. 1 is a block diagram of an exemplary ground fault circuit interrupting (GFCI) system in accordance with the present disclosure.

A ground fault circuit interrupting (GFCI) system, which may include a ground fault circuit interrupting (GFCI) device, or a GFCI device combined with an arc fault circuit interrupting (AFCI) device, is taught. The GFCI system includes a GFCI device or a GFCI/AFCI device having a processor coupled to one or more transformers that detect one or more electrical fault conditions. The processor can be a microcontroller (FIG. 1), a system on chip (SOC) (FIG. 2), field programmable gate array (FPGA), etc. Collectively the one or more components, which can include the processor, microcontroller, SOC, and/or FPGA, for performing the various functions and operations described herein are part of a controller, as recited, for example, in the claims.

The processor, microcontroller, etc. processes signals output by the transformers and determines when an electrical fault condition has occurred. In one embodiment, for example, the microcontroller is provided as a single integrated circuit (IC) chip which can be mounted on a single printed circuit board (PCB). Alternatively, the various circuit components, including, for example, the processor, microcontroller, etc. are provided as one or more integrated circuit chips. That is, the various circuit components are located on one or more integrated circuit chips.

The GFCI device includes a reference voltage circuit that receives and processes a power signal and generates a corresponding reference voltage signal. The GFCI device uses an operational amplifier (opamp) to amplify a sensor signal, e.g., a voltage differential signal generated by a differential transformer indicative of the occurrence of a first electrical fault condition. The reference voltage signal is input to both the opamp and the microcontroller. The microcontroller executes software that processes the reference voltage signal and the amplified voltage differential signal, ignoring high amplified differentials that would otherwise indicate the occurrence of a fault condition when a value (e.g., magnitude) of the reference voltage signal exceeds a noise threshold $T_n$ (e.g., a voltage threshold) The effect is to improve noise immunity by filtering out high energy spurious noise that is not related to a ground fault, grounded neutral fault, or arc fault condition.

Additionally, the GFCI device is provided with a frequency dependent gain circuit that applies a first gain when amplifying a voltage differential indicative of detection of a ground fault signal, and a second gain when amplifying a voltage differential indicative of detection of a grounded neutral fault signal.

The microcontroller executes a variety of software modules, including an integrator module that integrates the amplified differential signal while subtracting a value (e.g., a bleed value), thereby summing the amplified differential signal without accumulating unwanted noise; a gain determination module for adjusting gain constants for calibrating the GFCI device; an opamp offset compensation module for determining and compensating for voltage offset of the opamp; and an opamp saturation compensation module for recognizing and compensating for opamp saturation.

Additionally, the microcontroller executes one or more software modules to automatically initiate a self-test, including triggering the creation of a simulated fault, in response to an event or a predetermined schedule and initiates a manual test in response to manual activation of a test actuator. Furthermore, the microcontroller executes one or more software modules to recognize when an actual fault or a simulated fault was sensed, including distinguishing between the occurrence of an actual fault and the occurrence of a simulated fault, triggers circuit interruption when an actual fault has been recognized, and indicates when a self-test or a manual test has failed.

During a self-test, the fault level may have a lower magnitude than the fault level required to be detected/interrupted during actual operation. Furthermore, during a self-test, fault detection may occur in a shorter time period than the minimum time requirement for recognition and interruption of a fault during actual operation. This avoids interference with circuit interruption and allows for a timely response in the event of an actual fault occurring simultaneously during a self-test. The self-test of the GFCI device according to the present disclosure can be performed at lower current levels (e.g., 4 ma or below), without tripping the GFCI device, as opposed to a manual test (e.g., 8 ma or below). During the self-test, the GFCI device can detect the occurrence of an actual fault which warrants circuit interruption, as opposed to prior art GFCI devices which cannot detect the occurrence of an actual fault during testing.

Figure 4A:
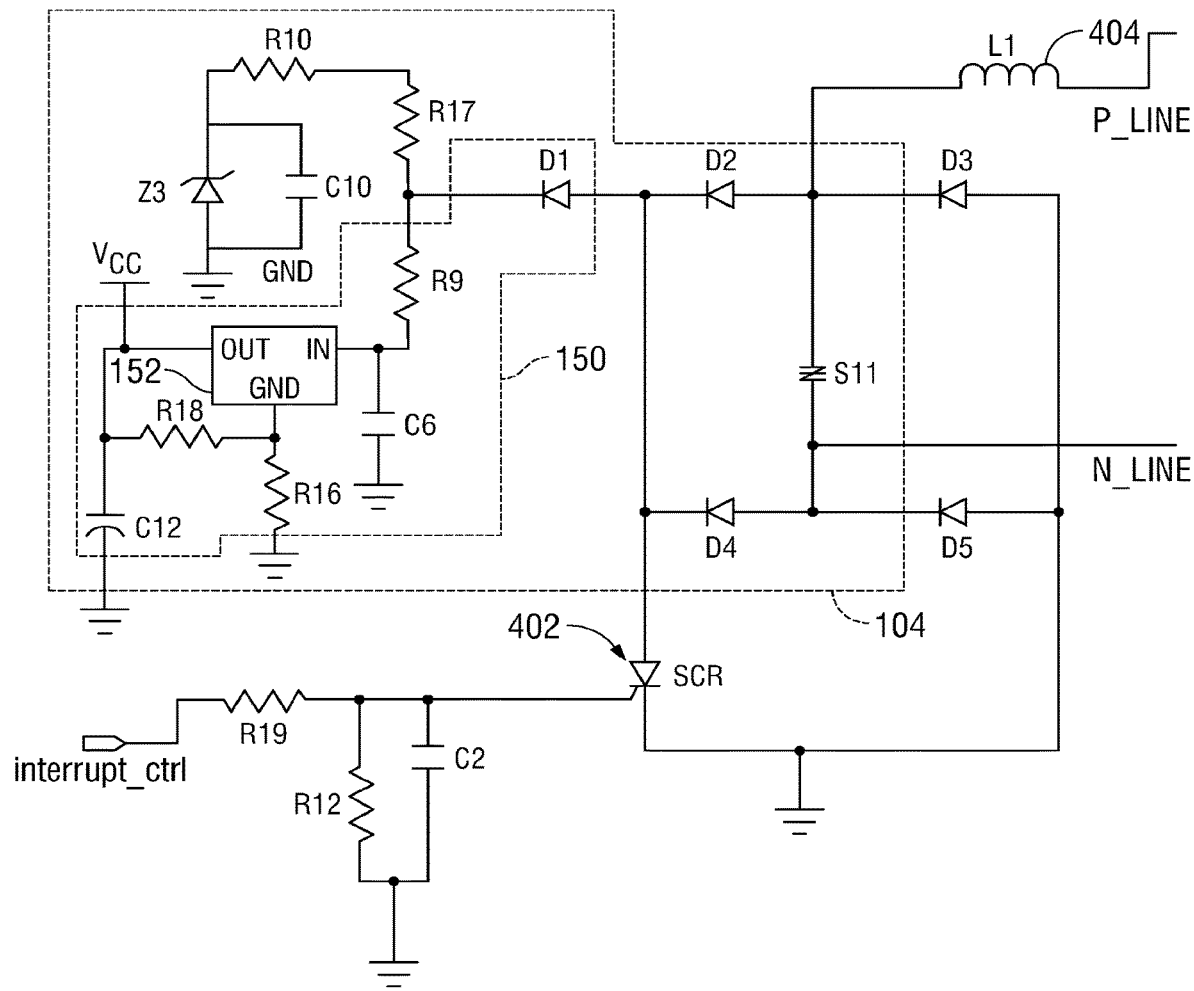
FIGS. 4A and 4B illustrate a schematic circuit diagram of the GFCI system shown in FIG. 2.

Referring now to the figures, in which like reference numerals identify identical or corresponding elements, the GFCI system in accordance with the present disclosure will now be described in detail. With initial reference to FIGS. 1, 2, and 4, an exemplary GFCI system in accordance with the present disclosure is illustrated and is designated generally GFCI system 100. GFCI system 100 includes a GFCI device 200 having a fault sensor assembly 102 that senses a variety of electrical faults associated with phase and neutral line signals provided by a power source 104 (e.g., 120 VAC), such as for delivery to a load 106 (see FIG. 2). The power signal provided by the power source 104, may be, for example, a power signal provided by a utility company, or a power signal provided to a portion of a residential or commercial electrical system, such as via a branch circuit.

Output from the fault sensor assembly 102 is provided to a microcontroller 110 which controls a line interrupt assembly 108 that is configured to interrupt power to the load 106 upon detection of a fault condition. In some instances, the load 106 may be an unintended load, such as a person receiving a shock, and the interruption of power prevents current from flowing through the person. Additionally, microcontroller 110 controls a test circuit 109 that is configured to initiate a test fault condition.

The fault sensor assembly 102 includes a differential current transformer (e.g., a fault sensor) 112 and a grounded neutral (G/N) transformer 114. The differential transformer 112 detects or senses an imbalance between current flowing through the phase and neutral conductors which is indicative of a ground fault condition. When an imbalance is detected, the differential transformer 112 outputs a differential signal having a voltage (herein referred to as a differential voltage) that corresponds to the sensed difference between the currents flowing through the phase and neutral conductors. A first part of the differential signal S1 is provided to a negative input terminal 111 of an operational amplifier (opamp) 116, and a second part of the differential signal S2 is provided to a positive input terminal 113 of the opamp 116 that amplifies the differential voltage in accordance with the gain of the opamp 116 and outputs a corresponding signal $S_{OUT}$ from an output terminal 115 of opamp 116 having a voltage Vout that corresponds to amplification of the differential voltage. When a ground fault condition occurs, the differential signal has a first frequency f1 that corresponds to the frequency f1 of the signals flowing through the phase and neutral conductors, e.g., the power signal frequency.

A reference voltage signal Sref having a voltage Vref is generated by a reference voltage circuit 118 and provided to the positive terminal 113 of the opamp 116 as well as to the microcontroller 110. The reference voltage circuit 118 receives an input voltage signal having voltage Vcc from the power source 104 and includes one or more electrical components, such as a resistor divider circuit, for operating the input voltage signal in a predetermined fashion for generating Vref as function of Vcc. The reference voltage circuit 118 reduces Vcc in accordance with a predetermined factor and outputs reference signal Sref having voltage Vref. In the present example, Vref=½(Vcc), however other predetermined functions are envisioned, provided that 0<Vref≤Vcc.

The predetermined function is provided to microcontroller 110 such that the microcontroller 110 recognizes an acceptable range for Vref and can extrapolate information about Vcc based on Vref. By providing Sref to both the input of the opamp 116 and the microcontroller 110, the microcontroller 110 can determine quickly in real-time when Vref exceeds a noise threshold $T_n$. If Vref exceeds the noise threshold it indicates that a high value output from the output terminal 115 of opamp 116 is not due to an actual fault (i.e., a fault warranting circuit interruption) but to spurious noise generated by the power source 104 that does not warrant circuit interruption. That is, the high value output is not due to an actual fault condition (e.g., arcing, high current flow, etc.) that should trigger a circuit interruption. Spurious noise may be caused, for example, by a power surge, switching power supplies, fans controlled by switches and fan controllers, chattering relays, and high energy pulses.

Noise immunity is improved by providing Sref to microcontroller 110 for filtering out spurious noise. This allows for elimination of conventional analog filter components configured to filter out spurious noise, such as a large capacitance capacitor (>1 uF) in the power source 104 or voltage regulator 150 (see below). By eliminating the use of such a large capacitance capacitor, power-up can be faster and without transition to a charged state, cost is reduced, and consumption of space on the PCB is reduced. Additionally, the microcontroller 110 can monitor noise on the power source 104 using another reference voltage and/or other solutions that are known in the art voltage monitoring.

Opamp 116 may be integrated with microcontroller 110 or distinct therefrom. An analog-to-digital converter (ADC) 127 is provided that may be a standalone device (see FIG. 2) or may be integrated with opamp 116 and/or microcontroller 110 (see FIG. 4A).

When Vout exceeds an actual fault threshold $T_{af}$ and Sref does not exceed the noise threshold $T_n$, then the microcontroller 110 treats the occurrence as an indication of an actual fault, as opposed to noise. The microcontroller 110 may further process Vout, such as by performing an integration algorithm, for determining if an actual fault has occurred. When the processing results indicate that an actual fault has occurred, microcontroller 110 triggers a circuit interruption.

However, when the microcontroller 110 determines that Vout exceeds the fault threshold $T_{af}$ and Vref exceeds the noise threshold $T_n$ based on acceptable values for Vcc and the predetermined function, then there is not an indication that an actual fault has occurred. Vout is ignored and is not further processed for determining if an actual fault has occurred. This improves noise immunity by avoiding unnecessary circuit interruption.

The grounded neutral transformer 114 and the differential transformer 112 are arranged or configured to be in a proper electrical phase relationship with respect to each other. This may be achieved in any suitable manner, such as, for example, physically positioning or arranging the grounded neutral transformer 114 and the differential transformer 112 in a particular orientation with respect to each other such that the direction of current flow in one transformer is along a particular direction with respect to the direction of current flow of the other transformer. The resonant circuit 120 may include a capacitor having a selected capacitive value that will create resonance upon inductance of the grounded neutral transformer 114.

Output of the opamp 116 at output terminal 115 is connected through the resonant circuit 120 to the grounded neutral transformer 114. The opamp 116 is in a proper electrical phase relationship with the differential transformer 112 such that opamp 116 oscillates upon the occurrence of a grounded neutral condition at a second frequency f2, such as when an unwanted electrical path is created between the phase conductor and a ground conductor. When a grounded neutral condition is present, the grounded neutral transformer 114 injects or outputs a signal into the line. The signal creates an imbalance in the currents passing through differential transformer 112 which causes the differential transformer 112 to output the differential signal having the second frequency f2. In the present example, f2=6-7 kHz.

Figure 2:
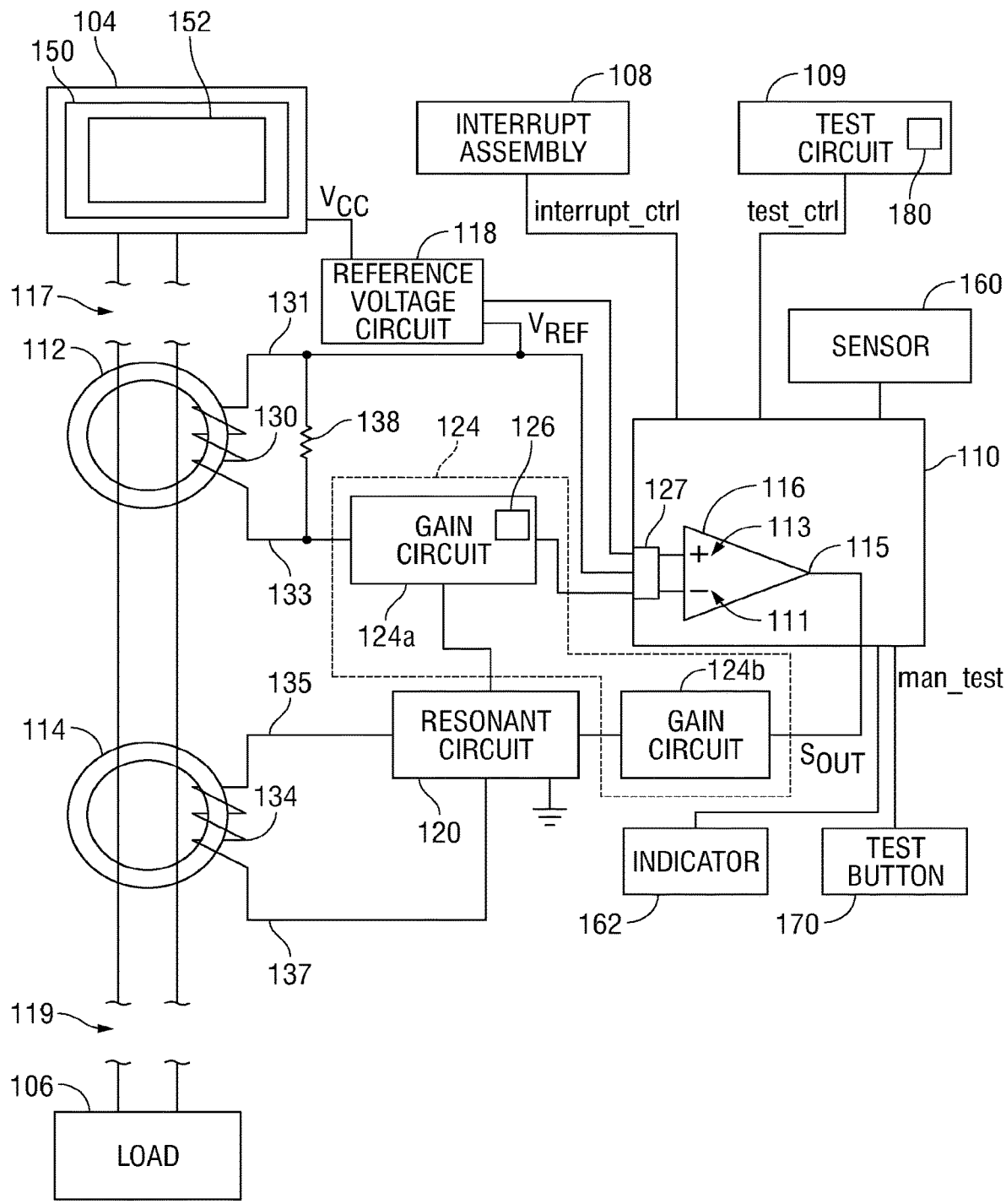
FIG. 2 is a block diagram of an exemplary embodiment of the GFCI system shown in FIG. 1.
Figure 3:
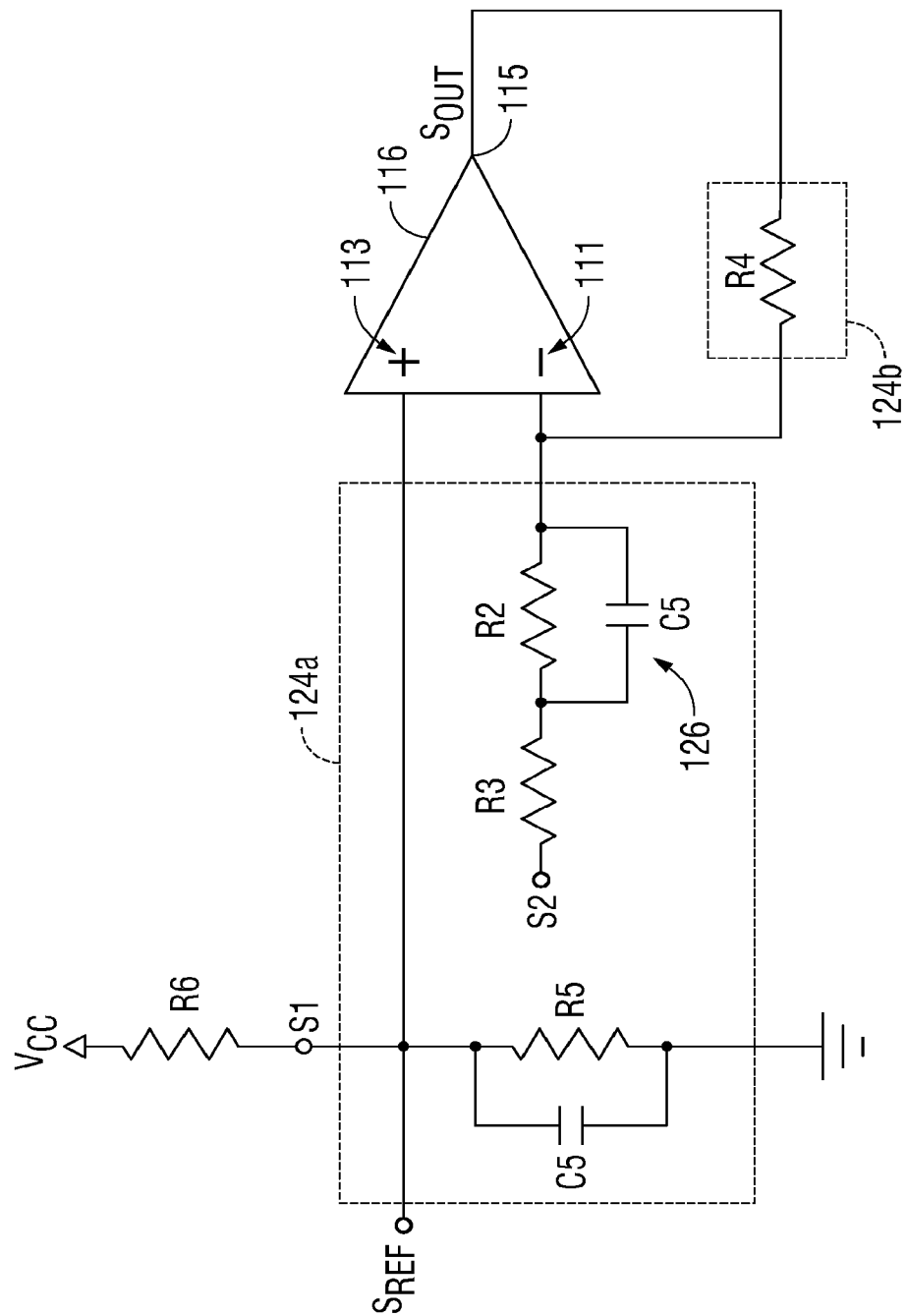
FIG. 3 is a circuit diagram of an operational amplifier and an associated gain circuit of the embodiment of the GFCI system shown in FIG. 2.

With continued reference to FIGS. 2 and 3, an exemplary embodiment of GFCI system 100 is shown in greater detail, including gain circuit 124 that is configured to determine a gain G for opamp 116 that defines the degree of amplification provided by opamp 116. Gain circuit 124, including first and second gain circuits 124a and 12b, one or more resistors, and a frequency dependent component 126. Examples of the frequency dependent component 126 include a differentiating capacitor or a filtering circuit, e.g., a bandpass filter. Whereas the gain circuit 124 determines the gain G for opamp 116, the frequency dependent component 126 varies the gain G of opamp 116 based on the frequency of current passing through frequency dependent component 126.

When a ground fault occurs, differential transformer 112 is induced to generate a differential signal (e.g., signals S1 and S2) having a differential voltage and frequency f1, which is substantially equal to the frequency of the phase and neutral signals provided by the power source 104, e.g., 60 Hz. The differential voltage, e.g., V1−V2, is amplified by opamp 116 using a gain sufficient to detect faults ranging between 4 ma and 6 ma, e.g., by setting G substantially equal to M.

When a grounded neutral fault occurs, since grounded neutral transformer 114 is in a proper electrical phase relationship with the differential transformer 112, differential transformer 112 generates a differential signal having frequency f2 that corresponds to the resonance frequency of resonant circuit 120, e.g., 6-7 kHz. A substantially higher gain G is needed to provide oscillation during a grounded neutral condition, e.g., when the differential signal has a frequency of f2. Accordingly, when the differential signal has a frequency f2, G is set to N, where N is substantially greater than M. Frequency dependent component 126 is configured to achieve the higher gain G when the frequency of the differential signal is f2.

Phase and neutral line signal inputs are provided to conductors 101, 103, respectively, at a line side 117 thereof, and delivered at a load side 119 thereof to a load 106. Load 106 may be an intended load, such as an appliance or circuit, or an unintended load. The differential transformer 112 in the current example has a toroidal core 105 formed of a very high permeability material, such as permalloy (a nickel-iron magnetic alloy, with about 20% iron and 80% nickel content). The phase and neutral conductors 101 and 103 pass through the core 105 as primary windings. The differential transformer 112 is provided with a secondary winding 130 having a first end 131 and a second end 133. When there is an imbalance between currents flowing through the phase and neutral conductors 101 and 103 indicative of a ground fault condition, a current is induced in the secondary winding 130. A ground fault condition may be caused, for example, when an unwanted electrical path is created between the phase conductor 101 and a ground conductor.

The first and second ends 131 and 133 are coupled to an analog to digital converter (ADC) 127. In the present example, the ADC 127 is integrated with the opamp 116 which is integrated with the microcontroller 110, such as, for example, to provide a system on chip (SOC). In other embodiments one or more of the components ADC 127, the opamp 116, and the microcontroller 110 may be discrete from the other component(s). Alternatively, analog-to-digital conversion may be performed to the signal output by opamp 116 after amplification by opamp 116. The ADC 127 further receives Vref and converts it to a digital signal.

Sref is coupled to first end 131, which is further coupled to the positive input terminal 113 of opamp 116. Thus the voltage Vref is summed with V2 or biases V2. Opamp 116 amplifies V1+Vref−V2 and outputs $S_{OUT}$ having voltage Vout. Thus, when Vref spikes due to a spike in Vcc, Vout may spike as well. Since digitized Vref is further input to microcontroller 110, microcontroller 110 applies the predetermined function and an expected range of values for Vcc to determine whether Vref exceeds a noise threshold $T_n$. If so, an occurrence of Vout>$T_n$ may be caused by a power source related event rather than a ground fault event.

A burden resistor 138 having a resistor value of about at least 1 kohm is provided across ends 131, 133 to prevent magnetizing of the differential transformer 112 and to prevent saturation of the differential transformer 112 when detecting a fault associated with high current. The burden resistor ensures current flow across ends 131, 133 providing counter flux to counteract the buildup of flux due to a high current, minimizing the occurrence of saturation of the core.

The grounded neutral transformer 114 in the current example has a toroidal core 107 formed of a magnetic material, such as ferrite. The grounded neutral transformer 114 operates together with the differential transformer 112 to create feedback for the amplifier 116 when a grounded neutral fault condition exists. The phase and neutral conductors 101 and 103 further pass through the core 107 as primary windings. The grounded neutral transformer 114 is provided with a secondary winding 134 having a first end 135 and a second end 137.

Resonant circuit 120 is coupled to first and second ends 135, 137, with second end 137 terminating in a ground connection. First end 135 is further coupled to the negative input terminal 111 of the opamp 116. Resonant circuit 120 is further coupled via gain circuit 124b to the output from terminal 115 of opamp 116. When a grounded neutral fault occurs, resonant circuit 120 oscillates at its resonant frequency f2, inducing a current in the neutral conductor 103 which is detected as a ground fault by the differential transformer 112. When no such grounded neutral fault is detected, the resonant circuit 120 acts simply as a load and does not affect operation of the differential transformer 112.

Regulations specify the time interval in which a circuit interruption must take place upon the occurrence of a fault condition. The greater the magnitudes of the fault condition, the faster regulations expect circuit interruption to take place. For example, timing requirements specify that upon occurrence of a ground fault≥250 mA, the GFCI device 200 must interrupt the circuit in less than about 24 ms or about 3 half cycles. This can be particularly difficult to achieve during a power-up stage in which the power-up process can slow down interruption of the circuit. In order to accelerate the power-up process, power source 104 is provided with a voltage regulator 150 which includes a linear regulator component 152. The voltage regulator 150 can also be an integrated circuit chip, or have a discrete MOSFET or other controllable semiconductor component located externally.

GFCI device 200 may further include one or more sensors 160 that sense environmental conditions or parameters, such as temperature or humidity, and provide an output signal to microcontroller 110 indicative of the sensed environmental conditions. The environmental conditions may affect the sensitivity of the physical components of GFCI device 200, including differential transformer 112 and/or the grounded neutral transformer 114. Accordingly, the output from sensors 160 can be used by microcontroller 110 to make adjustments to one or more components, including software components, for achieving the sensitivity and precision required for sensing fault conditions.

For example, outside the temperature range of −35 degrees Celsius to 66 degrees Celsius the magnetic property of the differential transformer 112 can change and affect the performance of the GFCI device 200. A temperature sensor 160 can sense the temperature and determine if it is not within this range. If the temperature is not within this range, the sensor 160 transmits a signal to the microcontroller 110 to compensate for the change in the magnetic property of the differential transformer 112 by adjusting, for example, the value of C[i] in equation (3). Sensors 160 may be provided on an external face of the GFCI device 200, provided internal to the GFCI device 200, or be part of or incorporated with the microcontroller 110.

GFCI device 200 further includes a manual test button 170 that may be manually activated by a user for initiating a test routine using test circuit 109. Test button 170 may be provided on an external face of the GFCI device 200. As described further below, a test routine may be activated by microcontroller 110 without manual activation of test button 170. Manual activation of test button 170 opens contacts 173 (which may be provided as along lines identified by P_POST_CORE and N_POST_CORE), effectively tripping the GFCI device 200, thus eliminating the possibility of sensing the occurrence of an actual fault during a manually activated test routine.

With reference to FIG. 3, the gain circuits 124a and 124b and inputs to opamp 116 are shown in greater detail. S1 and Sref are input to positive input terminal 113, and S2 is input to the negative input terminal 111. Gain circuit 124a influences inputs S1 and S2. Frequency dependent component 126 influences S2, affecting the gain G in accordance with the frequency of S2. Gain circuit 124b operates on the $S_{OUT}$ as feedback to negative input terminal 111.

Figure 5:
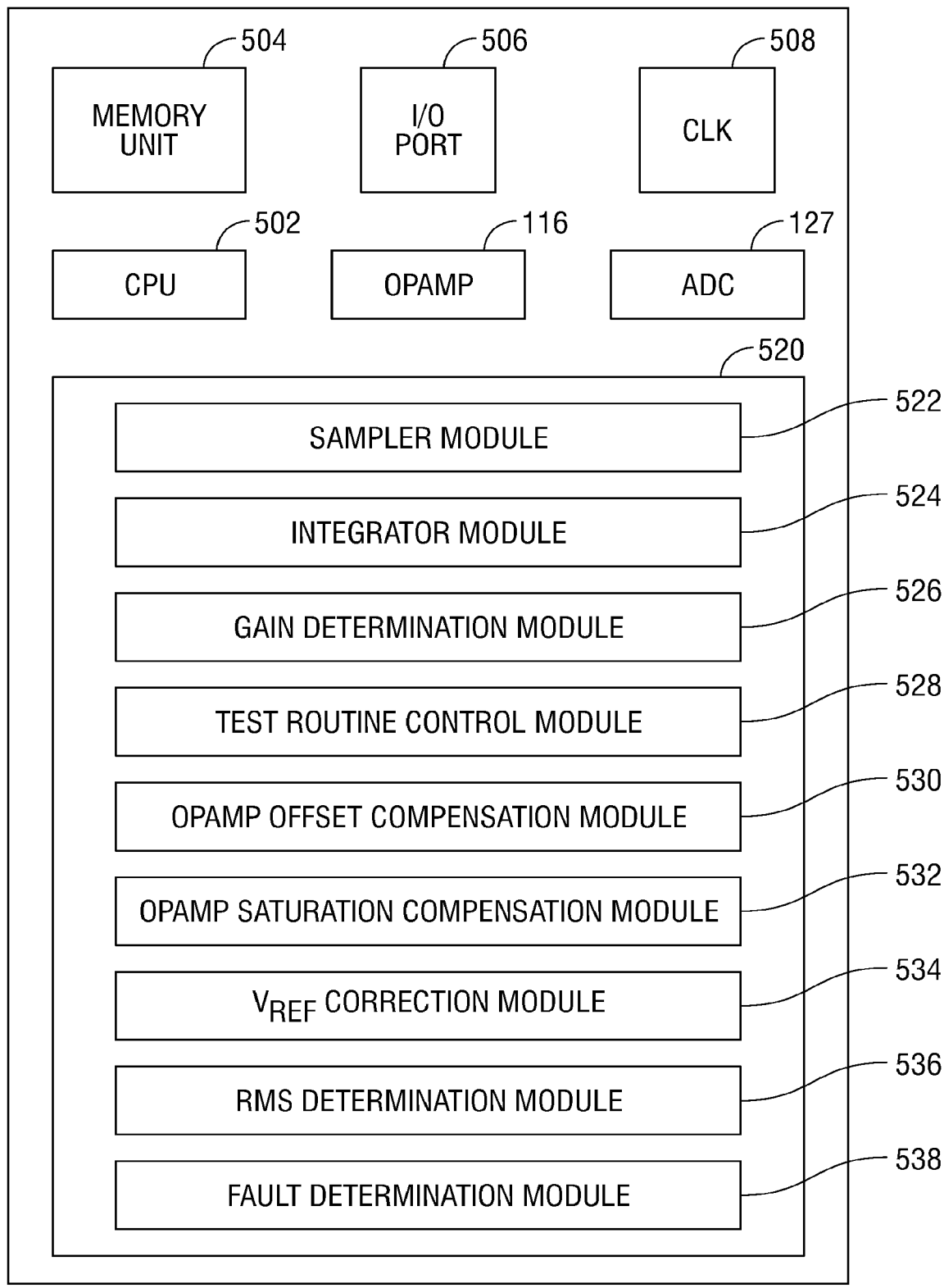
FIG. 5 is a block diagram of a microcontroller of the embodiment of the GFCI system shown in FIG. 2.

With reference to FIG. 5, the microcontroller 110 is shown in greater detail. The microcontroller 110 includes a central processing unit (CPU) 502; at least one memory unit 504, which may include one more types of memory, such as RAM, ROM, flash memory, EEPROM, etc.; a plurality of input/output ports 506; a clock unit CLK 508; opamp 116; ADC 127; and software modules 520 which include a series of programmable instructions that are executable by the CPU 502. The series of programmable instructions can be stored on a computer-readable medium accessible by the CPU 502, such as memory unit 504, for performing the functions disclosed herein and to achieve a technical effect in accordance with the disclosure.

The software modules 520 include several modules that may be discrete from one another or integrated together. The modules include a sampler module 522, an integrator module 524, a gain determination module 526, a test routine control module 528, an opamp offset compensation module 530, an opamp saturation compensation module 532, a reference voltage Vref correction module 534, an RMS determination module 536, and a fault determination module 538.

The sampler module 522 consults CLK 508 and controls sampling measured values, such as Vref and Vout output from the output terminal 115 of the opamp 116. In the current example, the sampling module 522 controls sampling to occur approximately every 255 us, or approximately 32 times per 60 Hz half cycle.

The gain determination module 526 receives a digitized form of Vout output from the output terminal 115 of opamp 116 and performs a gain calculation in software by applying one or more equations that use one or more gain constants. The gain determination module 526 is calibrated by adjusting the one or more gain constants for the calculation to achieve the requisite sensitivity, as per requirements set by regulations, e.g., UL Standards, to sense ground faults within a predetermined range, which in the present example is 4-6 mA. The required sensitivity is achieved by selection of resistor components in the gain circuit 124 (see FIG. 2) and selection of the software gain constants, for example, selection of C[i] in Equation (3) below. The software gain constants (e.g., C[i]) are stored in memory unit 524, e.g., in flash memory or EEPROM.

Accordingly, by combining software calculations with the use of analog components in the gain circuit 124, adjustments for achieving the required sensitivity may be made to the software gain constants without adjusting any hardware components. The calibration of the software gain constants may be performed at predetermined intervals or in response to an event, by performing an automatic diagnostic routine.

Additionally, the output from sensors 160 may be used to adjust the gain constants. A change in the output from sensors 160 may trigger a recalculation of the gain constants and/or performance of an automatic diagnostic routine.

Test routine control module 528 may initiate a test routine or be activated by an external event, such as activation of test button 170. When a test routine is initiated by manual activation of test button 170, the opamp offset compensation module 526 may be activated. Operational amplifiers typically have an associated input offset voltage which is amplified along with the input signal, causing an error that is significant in the GFCI device 200 because of the small differential voltage that is being amplified. Input offset voltage may further be influenced by ambient temperature. The opamp offset compensation module 530 compensates for the input offset voltage by measuring the differential voltage during a test routine that was initiated by activation of test button 170 which opens contacts 172 and excludes the possibility of an actual fault condition. During a manual test the expected value for Vout is known. The actual value for Vout is measured. The difference between the expected value for Vout and the actual value for Vout is determined and used as a compensation constant $C_{comp}$ that is subtracted in subsequent calculations from measured values associated with Vout.

Integrator module 524 performs an integration algorithm. Equations (1)-(3) below illustrate an exemplary algorithm for determining when a fault has occurred:

$$Vout[i+1]=Vout[i]-Bleed[i]; \text{ if } Vout[i]>Bleed[i]; \quad \text{Equation (1)}$$

$$Vout[i+1]=0 \text{ if } Vout[i]<=Bleed[i], \quad \text{Equation (2)}$$

where Vout[i] is Vout at time i, and i may be a whole number indicative of a sample iteration by sampler module 522. Bleed[i] may be a constant or a variable that varies over time. Additionally, the value for Bleed[i] may be selected, such as in accordance with whether or not a test operation is in progress.

Circuit interruption is triggered by fault determination module 538, described further below, when Vout[i]>Fault_Threshold[i]]. By integrating Vout[i] and providing a bleed value Bleed[i], false circuit interruptions for surges in which Vout[i]<Fault_Threshold [i] are avoided. In effect, a small value for Vout[i] will be cancelled out if it is below Bleed[i], and if not cancelled out, will only trigger circuit interruption if Vout[i] continues to accumulate over time. A short event that does not exceed Fault_Threshold[i] will neither trigger a circuit interruption nor continue to accumulate over time. The subtraction of Bleed[i], which can be subtracted at every sampling period or at every X sampling periods, where X is a predetermined whole number, prevents noise from accumulating in the calculations and triggering circuit interruption. The selection of Bleed[i], the selection of gain G as defined by the components of gain circuit 124 and the selection of Fault_Threshold[i] each influence the level of Vout that will trigger circuit interruption. Furthermore, Bleed[i] may be selected to have a different level during a manual test routine or an automatic test routing. This will allow for testing using a lower input to simulate a fault condition, and a lower threshold for recognizing a successful test. It is understood that different digital filters can be used by the fault determination module 538 than the digital filters described herein.

When opamp 116 is saturated (which may be indicated when ADC 127 reads a maximum or minimum value e.g., 255 or 0, respectively, for an 8 bit ADC), opamp saturation compensation module 532 compensates by increasing Vout by a predetermined factor before adding it to an integrating value. In the present example, the predetermined factor is "2." For smaller ground fault signals, this will accelerate response of the GFCI device 200 to fault conditions without compromising noise immunity, with the ability to satisfy timing requirements for interrupting the circuit.

When a fault condition occurs, e.g., Vout[i]>Fault_Threshold [i], as determined by the fault determination module 538, Vref correction module 534 compares Vref[i] to $T_n[i]$. When Vref[i] exceeds $T_n[i]$, it is an indication that the high value for Vout[i] was due to a spike in the power provided by the power source 104 and a corresponding spike in Vref, and not due to an electrical fault condition. $T_n[i]$ may vary, such as is in response to conditions sensed by sensors 160 or whether a test operation is in progress or not.

Vref correction module 534 ignores the culprit reading Vout[i] and thus prevents triggering a circuit interruption based on the culprit reading. Additionally, an action may be taken to eliminate noise from at least one subsequent determination of Vout[i]. One example of elimination of the noise includes increasing Bleed[i] for one or more predetermined iterations of calculating Vout[i]. Additionally or alternatively, for a predetermined time interval, gain G may be reduced and/or C[i] adjusted.

However, when Vref[i] is within the expected range, this indicates that the high value for Vout[i] may be an indication of a possible electrical fault condition. Vout is further processed, such as by the integrator module 524 for generating an integrated value and by the fault determination module 538 for comparison to Fault_Threshold, which could possibly result in circuit interruption.

RMS determination module 536 determines an RMS value for measured signal properties, such as Vout and Vref, for a signal, such as, for example, a sensor signal outputted by the differential transformer 112. The software modules 520 may determine RMS values that correspond to measured values and/or threshold values when performing calculations and making determinations, e.g., instead of average rectified current values, etc. UL requirements specify trip levels based on RMS rather than average current, thus providing guidelines that can be used by devices for a wide variety of applications in which power line voltage is not necessarily provided as a sine wave, such as in electrical power conversion applications. Conventionally, a GFCI system must be specially calibrated for use with such applications, because a conventional GFCI system is designed to measure average or peak current due to the power line voltage being a sine wave. RMS determination module 536, however, can determine the RMS value for an input wave of any shape by applying an appropriate algorithm without the need for calibration. That is the RMS determination module 536 applies RMS calculated values to the input signal.

The various constants for algorithms stored in the GFCI device 200 can be calibrated during manufacturing. The constants can be stored within the microcontroller 110, such as, for example, within an EEPROM of the microcontroller 110. The constants can be used to compensate for example, for differences in permeability of the magnetic core and/or number of turns of one or both of the transformers 112, 114, as well as variations in passive components. It is contemplated the calibration is performed for different temperatures and the corresponding constants for various temperatures in a particular temperature range stored in the GFCI device 200.

The GFCI device 200 may be tested via a manually initiated test or an automatically initiated self-test. When performing a self-test, the test routine control module 528 controls the test circuit 109 to generate a simulated ground fault. If the simulated ground fault is sensed, the GFCI device 200 continues normal operation. However, if the simulated ground fault is not sensed, the GFCI device 200 remains in a tripped condition or triggers a tripped condition so that power will not be provided to the load 106, and/or triggers an alarm.

During the self-test, the GFCI device 200 can detect the occurrence of an actual fault, as opposed to prior art GFCI systems which cannot detect the occurrence of an actual fault during testing. The GFCI device 200 can detect the occurrence of an actual fault during self-test because the contacts 173 are not opened during the self-test. That is, the self-test is performed without blocking or preventing tripping of the GFCI device 200.

Prior to a manual test the contacts 173 are opened. After the contacts 173 are opened, test button 170 is actuated and a man_test signal is transmitted. Test routine control module 528 receives the man_test signal and transmits a control signal test_ctrl to activate test circuit 109 for generating a simulated ground fault. Additionally, test routine control module 528 notifies the fault determination module 538 that a manual test is in progress. If fault determination module 538 detects the simulated fault, test routine control module 528 controls the contacts 173 to latch for resumption of normal operation. If the simulated fault is not detected by the fault determination module 538, the contacts 173 remain open in order that power is not provided to load 106.

The test routine control module 528 may also automatically initiate a self-test at a predetermined time interval and/or in response to an event. The time intervals may vary. For example, the time intervals may be relatively short following powering up of the GFCI device 200 to quickly ensure that installation is proper and all components are intact. The time intervals may be increased for less frequent testing once testing has indicated that the GFCI device 200 was properly installed and operates properly. The time intervals may be decreased once the GFCI device 200 has approached its expected lifetime duration. The test routine control module 528 initiates each automatic test by transmitting a control signal test_ctrl to activate test circuit 109 and notifying the fault determination module 538 that a self-test is in progress.

Accordingly, in the case of a manual test or an automatic self-initiated test, the test_ctrl signal is sent to the test circuit 109 to initiate a test procedure that creates a simulated test fault condition. U.S. Patent Application Serial No. US2010/0295568 describes an exemplary test circuit and operation of a simulated test, the entire contents of which are incorporated herein by reference.

Figure 4B:
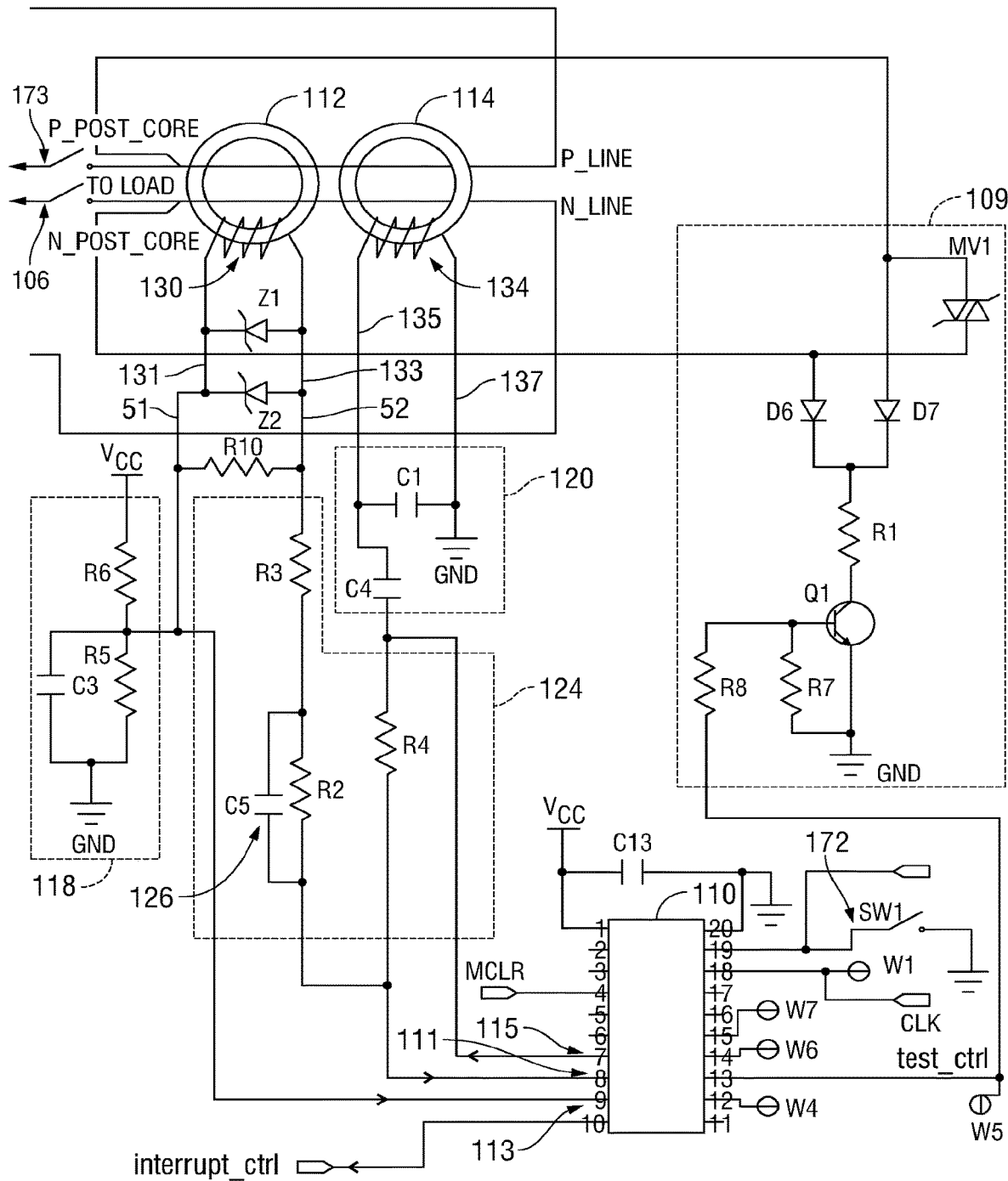

With additional reference to FIG. 2, test circuit 109 includes, with reference to FIG. 4B, transistor Q1, diodes D6, D7, and resistors R1, R7, and R8. The transistor Q1 is activated by the test_ctrl signal, e.g., by application of test_ctrl signal to the base of the transistor Q1. Activation of the transistor Q1 causes the test circuit 109 to generate a simulated ground fault by generating a test signal provided at the line side 117 of phase and neutral conductors 101 and 103, which produces an imbalance between the signals provided on the phase neutral conductors 101 and 103.

Test circuit 109 further includes rectifying components, e.g., a pair of diodes, for rectifying the sine wave test signal and producing a rectified sine wave. Test circuit 109 further may include one or more resistors through which the test signal passes. The imbalance is detected by the differential transformer 112, causing generation of a differential signal having a differential voltage that is amplified by opamp 116 and output as $S_{OUT}$ having voltage Vout. Vout is digitized by ADC 127, and monitored by fault determination module 538 for an indication that the test fault condition was sensed. Accordingly, the simulated ground fault generated by the test circuitry 109 tests operation of the differential transformer 112 and all components included in operating on the differential signal, including opamp 116, gain circuit 124, and ADC 127.

In FIG. 4B, the microcontroller 110 is an integrated chip, such as, for example, PIC16F785.

In the present example, during normal operation, Fault_Threshold is set to the actual fault threshold $T_{af}$. During a manual test or a self-initiated test, Vout[i] is monitored for indication of both a simulated ground fault and an actual fault. When monitoring for a simulated ground fault, Fault_Threshold is set to a test threshold $T_{tf}$, wherein the test threshold $T_{tf}$ is substantially lower than actual test threshold $T_{af}$. Thus, the simulated ground fault generated during a manual test or a self-initiated test does not need to be as large as an actual fault. The amplitude of the test signal applied to conductors 101 and 103 may be reduced accordingly. The reduced amplitude of the test signal decreases dissipation of heat across components such as the resistor(s) included in test circuit 109. During a self-test operation, Bleed[i], C[i] and Fault_Threshold can each be adjusted. These adjustments can speed up the self-test operation.

In the present example, the test signal generated by the test circuit 109 need not be synchronized with the power line signal. However, were an actual fault present during a self-initiated test, there is a possibility that it may be cancelled during a half cycle due to the rectification and therefore, the actual fault will not detected, or the actual fault be reduced based on the phase conditions between applied test fault and present fault. Therefore, an automatically initiated self-test would need to be performed over the course of substantially at least two consecutive half cycles, or two different polarity half cycles, to compensate for a possible standing actual fault. Therefore, in the present example the test signal is provided for approximately two full successive half-cycles of the test signal. Alternatively, GFCI device 200 may be provided with zero-crossing circuitry for synchronizing the test signal with the power line signal.

Fault determination module 538 continually monitors the output from integrator module 524 and compares the output to Fault_Threshold, such as by determining whether Vout[i]>Fault_Threshold[i], Additionally, Fault_Threshold [i] may vary, e.g., in accordance with Equation (3)

$$\text{Fault\_Threshold } [i+1]=Vout[i]-C[i] \qquad \text{Equation (3)}$$

In the simplest case, C[i] is a constant. Alternatively, C[i] may vary, e.g., with measured current level. The trip level, Fault_Threshold, which is 4-6 ma in the present example, is defined by the set of C[i] and the resistance of resistors provided in gain circuit 124.

Even when a self-test operation is in progress, fault determination module 538 may monitor for an actual fault in addition to detection of a simulated ground fault. When an actual fault is detected, the fault determination module 538 triggers a circuit interruption. However, circuit interruption will not be triggered during a ground fault simulation when a test signal is applied for two half cycles, because the increase in Vout caused by the test signal adds only a small amount to the integrated value and is bled off in time by subtraction of the bleed value Bleed[i]. Additionally, Bleed [i] may be adjusted during the test operation to encourage such bleeding off. Accordingly, circuit interruption will not be triggered during the course of a self-initiated test or a manual test unless an actual fault has occurred.

Upon notification that a self-test has been initiated, fault determination module 538 monitors, over a predetermined test interval time, the digitized output of opamp 116 and compares Vout to test fault threshold $T_{tf}$, where the test fault threshold $T_{tf}$ is substantially less than the actual test threshold $T_{af}$. If Vout exceeds the test fault threshold $T_{tf}$ during the test interval time then a successful test has occurred. A timestamp for the successful test may be recorded in memory 204. If Vout does not exceed the test fault threshold $T_{tf}$ during the test interval time then the test has failed. Upon the occurrence of a failed test or a series of a predetermined number of failed tests, the fault determination module 538 activates an indicator device 162 (e.g., an LED indicator or a buzzer) to alert a user, and may also trigger a circuit interruption.

Circuit interruption includes generating an interrupt_ctrl signal that is provided to a component of the line interrupt assembly 108. The line interrupt assembly 108 may include, as shown in exemplary FIG. 4A, an actuator, such as an SCR 402 and a solenoid 404 that operate together to open contacts 172 shown in FIG. 4B such that current will not flow to load 106. In the present example, interrupt_ctrl signal actuates the SCR 402 which actuates the solenoid 404 to open contacts 172, and thus trip the GFCI device 200.

In addition to the test performed by test circuit 109, microcontroller 110 may perform one or more internal diagnostic tests to check internal components, such as RAM and ROM included in memory unit 504. The diagnostic tests can be performed periodically by programming the microcontroller 110. For example, microcontroller 110 can monitor the voltage input to voltage regulator 150 for detecting when a bridge diode (includes diodes D2-D5 shown in FIG. 4A) of a bridge rectifier associated with the power source 104 fails to conduct current.

Figure 6:
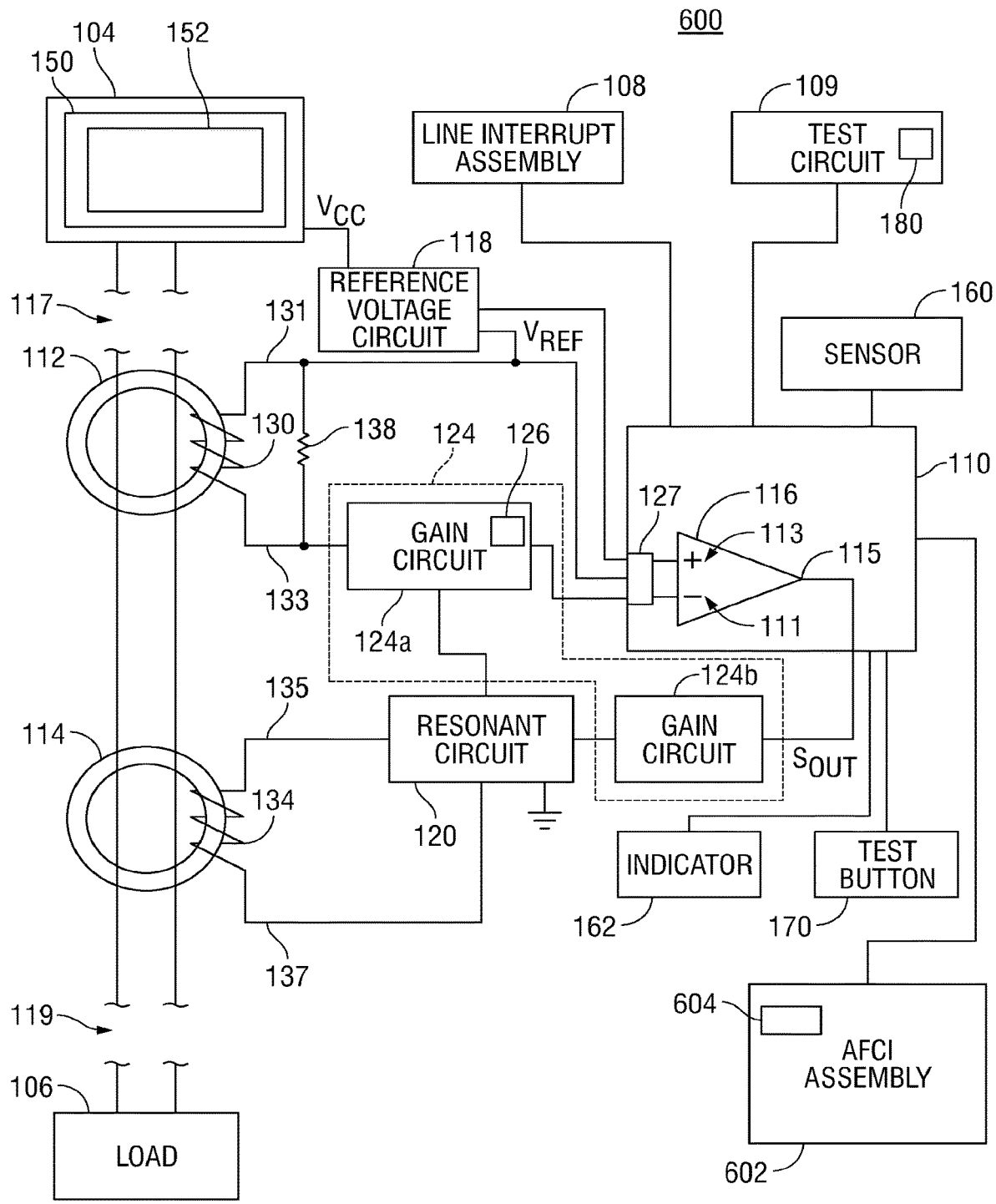
FIG. 6 is a block diagram of an exemplary GFCI and arc fault circuit interrupting (AFCI) system in accordance with the present disclosure.

FIG. 6 shows an exemplary GFCI/AFCI system 600. GFCI/AFCI system 600 includes the components included in GFCI device 200, and further includes an AFCI assembly 602 that communicates with microcontroller 110. AFCI assembly 602 includes at least one sensor device 604 for sensing arcing conditions that output at least one signal indicative of the presence of an arcing condition. AFCI assembly 602 may further include one or more analog components (not shown) for conditioning signals provided to and from the at least one sensor. The at least one signal is provided to the microcontroller 110 which processes the at least one signal for determining if an arcing condition is present. If microcontroller 110 determines that an arcing condition is present, the microcontroller 110 triggers a circuit interruption. Microcontroller 110 may further initiate and monitor tests for creating a simulated arcing condition and determining if the AFCI assembly accurately sensed the condition such that it could be detected by microcontroller 110.

In the present example, the GFCI/AFCI system 600 is packaged as a single integrated chip. Furthermore, the GFCI/AFCI system 600 may be packaged or provided as a single printed circuit board.

One or more of the concepts and novelties of the present disclosure can be incorporated in traditional GFCI devices, AFCI devices and other type of circuit interrupting devices by one skilled in the art, such as, for example, non-digital GFCI devices, AFCI devices, and other type of circuit interrupting devices. Therefore, it will be appreciated that features of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed:

1. A fault circuit interrupting device for selectively coupling a power source to a load, the fault circuit interrupting device comprising:
    a fault sensor configured to output a sensor signal, the fault sensor including a differential transformer and a grounded neutral transformer, wherein the grounded neutral transformer is configured to output a signal if a neutral conductor is grounded;
    a first gain circuit electrically coupled to the differential transformer and configured to output a first gain signal for amplifying a first signal to provide a first amplified signal;
    a second gain circuit in series with the first gain circuit, wherein the second gain circuit is electrically coupled to the grounded neutral transformer and is configured to output a second gain signal; and
    a controller configured to determine an occurrence of an actual fault based on the sensor signal.

2. The fault circuit interrupting device according to claim 1, further comprising a voltage sensor configured to output a reference voltage signal,
    wherein the controller is further configured to determine whether the reference voltage signal exceeds a voltage threshold in determining the occurrence of the actual fault.

3. The fault circuit interrupting device according to claim 2, further comprising:
    an analog-to-digital converter configured to receive the reference voltage signal and the first amplified signal and output respective digital signals corresponding to the reference voltage signal and the first amplified signal; and
    a line interrupt assembly configured to interrupt current flow through a conductive path when a characteristic of the first amplified signal exceeds an actual fault threshold.

4. The fault circuit interrupting device according to claim 2, further comprising a test circuit configured to generate a simulated electrical fault condition,
    wherein the controller is configured to:
        initiate a test operation including triggering the test circuit to generate the simulated electrical fault condition,
        determine whether a characteristic of the first amplified signal exceeds a test fault threshold during performance of the test operation without triggering a line interrupt assembly unless the characteristic of the first amplified signal exceeds an actual fault threshold, and
        indicate an occurrence of a test failure when the test operation terminates and the determination is false,
    wherein the line interrupt assembly interrupts current flow through a conductive path when the characteristic of the first amplified signal exceeds the actual fault threshold.

5. The fault circuit interrupting device according to claim 2, further comprising a memory unit,
    wherein the controller is configured to:
        execute an algorithm for calculating the first gain, the algorithm including at least one constant that influences the calculation of the first gain, the at least one constant being stored in the memory unit, and
        adjust the at least one constant for adjusting the calculation of the first gain during a calibration procedure.

6. The fault circuit interrupting device according to claim 2, further comprising a memory unit,
    wherein the controller is further configured to:
        determine an approximate value for a characteristic of the first amplified signal during a test operation in which the approximate value for the characteristic of the first amplified signal is approximately known, determine a value for the characteristic of the first amplified signal as measured during the test operation, determine a difference between the approximate value for the characteristic of the first amplified signal and the determined value for the characteristic of the first amplified signal, store the difference as an offset compensation constant in the memory unit, and apply the offset compensation constant in subsequent determinations of the value for the characteristic of the first amplified signal.

7. The fault circuit interrupting device according to claim 2, wherein the controller comprises a compensation module for determining when a first amplifier is saturated and, based on determining the first amplifier is saturated, adjusting a value for a characteristic of the first amplified signal.

8. The fault circuit interrupting device according to claim 2, wherein the controller is further configured to:

iteratively sample a characteristic of the first amplified signal, and calculate an integrated value for the characteristic of the first amplified signal iteratively, including executing an integration algorithm using the sampled values for the characteristic of the first amplified signal.

9. The fault circuit interrupting device according to claim 1, further comprising a resistor connected across a first and a second conductor via which the sensor signal is output from the fault sensor for avoiding saturation of the differential transformer.

10. The fault circuit interrupting device according to claim 1, further comprising a sensor configured to sense an environmental parameter and provide an output signal indicative of the environmental parameter.

11. The fault circuit interrupting device according to claim 10, wherein the controller is further configured to adjust at least one software component of the fault circuit interrupting device in accordance with the output signal indicative of the environmental parameter.

12. The fault circuit interrupting device according to claim 10, wherein the environmental parameter is one selected from the group consisting of humidity and temperature.

13. The fault circuit interrupting device according to claim 10, wherein the sensor has a location of one or more of: internal to a housing of said fault circuit interrupting device, external to the housing of said fault circuit interrupting device, or integrated within said controller.

14. The fault circuit interrupting device according to claim 1, further comprising:

a solenoid in operative communication with the fault sensor, wherein upon the occurrence of an actual fault, a signal is generated to energize the solenoid, the actual fault being associated with current flowing through a conductor electrically coupled to a power source;

a test circuit configured to generate a simulated fault condition along the conductor, the simulated fault condition including a simulated fault current; and a line interrupt assembly configured to interrupt current flow through the conductor, wherein the controller is further configured to control the test circuit to generate the simulated fault current, the simulated fault current having a value less than a fault current value that would be required to trigger the line interrupt assembly.

15. The fault circuit interrupting device of claim 14, further comprising:

a bridge rectifier including a plurality of diodes; and a voltage regulator in operative communication with the controller and the bridge rectifier, the voltage regulator being configured to output a voltage, wherein the controller is configured to monitor the voltage for detecting failure of one or more of the plurality of diodes.

16. The fault circuit interrupting device according to claim 14, wherein an amplitude of the simulated fault current is less than an amplitude of a fault current generated during an actual fault.

17. The fault circuit interrupting device according to claim 14, wherein the conductor is a first conductor, the fault circuit interrupting device further comprising a second conductor, wherein the test circuit generating the simulated fault current includes generating an imbalance in currents passing through the first and second conductors.

18. The fault circuit interrupting device according to claim 17, wherein the test circuit generating the imbalance includes adding a supplemental current to one of the first or second conductors, wherein the supplemental current is not synchronized with a current output by the power source.

19. The fault circuit interrupting device according to claim 18, wherein the supplemental current is generated through a portion of two half cycles associated with the current output by the power source.

20. The fault circuit interrupting device according to claim 1, wherein the first gain signal is configured to permit detection of a ground fault based on the first amplified signal, and wherein the second gain signal is configured to permit oscillation of the sensor signal in case of a grounded neutral condition.

21. The fault circuit interrupting device according to claim 1, wherein the controller is further configured to monitor a voltage input to a voltage regulator for detecting when a bridge diode fails to conduct current.

22. A fault circuit interrupting device for selectively coupling a power source to a load, the fault circuit interrupting device comprising:

a fault sensor assembly including a differential transformer configured to output a sensor signal and a grounded neutral transformer configured to output a signal if a neutral conductor is grounded, wherein the differential transformer outputs the sensor signal based on the output signal of the grounded neutral transformer;

a first gain circuit electrically coupled to the differential transformer and configured to output a first gain signal for amplifying the sensor signal to output an amplified sensor signal;

a second gain circuit in series with the first gain circuit, wherein the second gain circuit is electrically coupled to the grounded neutral transformer and is configured to output a second gain signal for amplifying the amplified sensor signal; and a controller configured to determine an occurrence of an actual fault based on the amplified sensor signal.

23. A method for monitoring a circuit for an electrical fault condition, the method comprising:

receiving a voltage signal and generating a reference voltage signal;

digitizing the reference voltage signal using an analog-to-digital converter to provide a digital signal corresponding to the reference voltage signal;

amplifying a first signal from a differential transformer to provide a first amplified signal;

generating a second signal based on the first amplified signal and coupling the second signal to a grounded neutral transformer, the second signal being distinct from the first amplified signal; and determining an occurrence of an electrical fault condition based on the digital signal corresponding to the reference voltage signal and the first amplified signal.

* * * * *